United States Patent [19]

Lee et al.

[11] Patent Number: 4,803,694

[45] Date of Patent: Feb. 7, 1989

[54] LASER RESONATOR

[75] Inventors: Chun-Sheu Lee, Torrance; Stanley L. Ream, Laguna Beach, both of Calif.

[73] Assignee: Amada Company, Limited, Japan

[21] Appl. No.: 71,155

[22] Filed: Jul. 8, 1987

[51] Int. Cl.[4] .............................................. H01S 3/13
[52] U.S. Cl. .................................... 372/98; 372/29; 372/33; 372/101; 372/103
[58] Field of Search ................... 372/29, 92, 98, 99, 372/101, 103, 108, 33

[56] References Cited

U.S. PATENT DOCUMENTS

| | | | |
|---|---|---|---|
| 3,532,879 | 10/1970 | Braunstein et al. | 372/101 |
| 3,657,510 | 4/1972 | Rothrock | 372/103 |
| 3,735,278 | 5/1973 | Schafer et al. | 372/103 |
| 4,032,861 | 6/1977 | Rothrock | 372/103 |
| 4,724,404 | 2/1988 | Cochran | 372/33 |

OTHER PUBLICATIONS

Decker et al; "Physical and Optical-Advanced Machine"; pp. 122–128.

Siegman; "Unstable Optical Resonators"; Applied Optics; vol. 13, No. 2, Feb. 1974; pp. 353–367.

Sarkies, P. H., "A Stable Yag Resonator Yielding a Beam of Very Low Divergence and High Output Energy", *Optics Communications*, vol. 31, No. 3, Nov. 1979.

*Primary Examiner*—William L. Sikes
*Assistant Examiner*—Xuan Thi Vo
*Attorney, Agent, or Firm*—Wigman & Cohen

[57] ABSTRACT

To generate a laser beam of significantly higher quality and high output power without damaging the output coupler (mirror), a novel stable optical laser resonator includes, in particular, a retro-reflector having an aspherical concave mirror for correcting intracavity wavefront aberrations induced when the laser beam travels through the lasing medium. The optimal surface constants of the geometry of the aspherical mirror are determined by an optical interferometry technique, an geometrical ray-tracing technique, and computer-aided ray tracing technique.

9 Claims, 5 Drawing Sheets

FIG. I
(PRIOR ART)
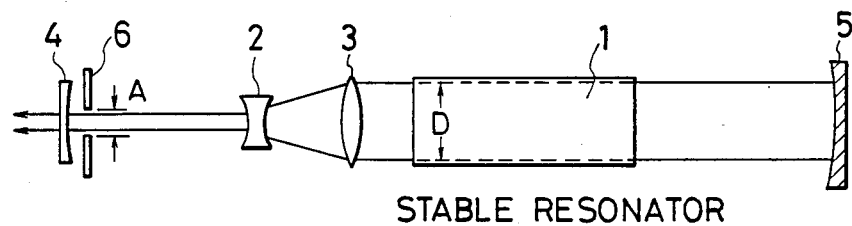
STABLE RESONATOR
FIG. 2(A)
(PRIOR ART)
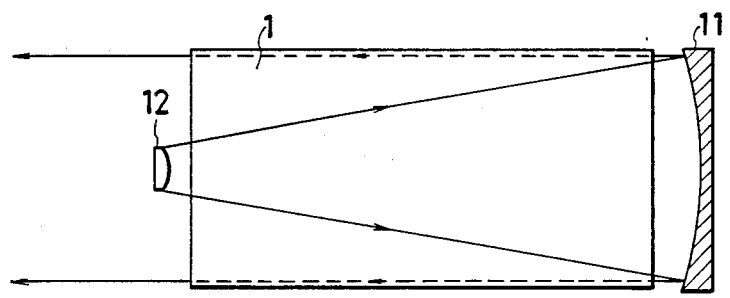
UNSTABLE POSITIVE BRANCH RESONATOR
FIG. 2(B)
(PRIOR ART)
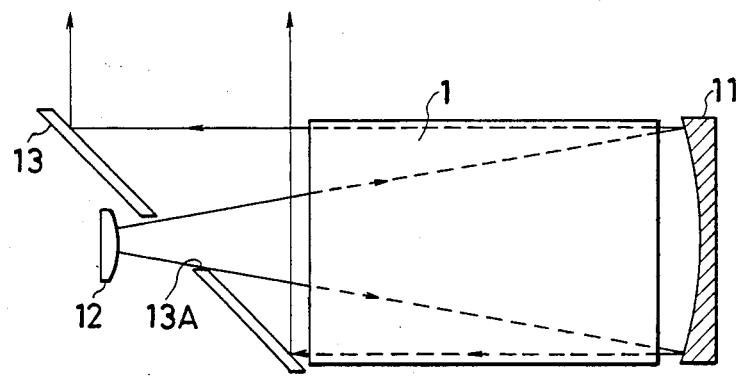
UNSTABLE POSITIVE BRANCH RESONATOR

STABLE

UNSTABLE

POSITIVE BRANCH

NEGATIVE BRANCH

LASER RESONATOR

BACKGROUND OF THE INVENTION

1. Field of the Invention

The present invention relates generally to a laser resonator, and more specifically to a stable laser resonator provided with an intracavity wavefront correction device. The correction device includes intracavity optics (optical elements) for correcting the phase of regenerative wavefront within the resonator cavity, in particular of solid-state lasers employing a lasing gain medium of a large cross-sectional area.

2. Description of the Prior Art

In an optical laser resonator, photons oscillating from one end of the resonator to the other end thereof constitute electromagnetic energy which forms an intense electromagnetic field. The shape of this field is precisely dependent not only upon the photon wavelength, but also upon the mirror alignment, curvature and spacing, and upon the bore diameter of the laser tube. This field can assume many different cross-sectional shapes, termed transverse electromagnetic modes (TEM), but only certain modes, or mixtures of them, are useful for utilizing the laser power.

To operate lasers in the fundamental (single) mode (i.e. $TEM_{00}$ or Gaussian mode), an aperture is usually formed in the resonator to prevent oscillations of higher-order modes. Consequently, the laser efficiency is generally lower as compared with multimode operation (e.g. $TEM_{11}$), because the gain medium (lasing medium) involved in laser action is small in volume. To construct high-output power lasers, the mode volume is required to increase. There are two schemes toward better solutions evolved mainly along two ways: stable telescopic resonators and unstable resonators.

In stable telescopic resonators, a magnifying telescope is additionally provided for a conventional stable cavity to expand the mode cross sectional area in the arm of the cavity where the electromagnetic field interacts with the gain medium. In the resonators of this type, the beam quality is high, but the $TEM_{00}$ mode volume is still limited because of thermal distortion (i.e. aberration) induced in the gain medium. In addition, at high laser power, there arises another problem such that the optical elements may be damaged at the resonator position where the beam is small in dimension.

Unstable resonators are usually used when coupled to a gain medium of large volume with good optical quality, that is, with uniform azimuthal and radial modes without phase reversal in the output aperture. Although the output beam of an unstable resonator is a plane wave and has sufficiently low divergence, there exists a problem in that the electromagnetic field presents a peculiar spatial shape due to the usual diffraction-coupled output, which creates an annular near-field output beam, viz. a central hole in the near-field intensity distribution.

The configuration of the prior-art resonators will be described in further detail with reference to FIGS. 1 to 4 under DETAILED DESCRIPTION OF THE PREFERRED EMBODIMENTS.

SUMMARY OF THE INVENTION

With these problems in mind, therefore, it is the primary object of the present invention to provide a laser resonator by which a large lasing volume can be optically coupled in a single azimuthal and radial mode to provide significantly higher beam quality and high output laser power, without damaging the resonator element and creating a hole in the field intensity distribution.

The other object of the present invention is to provide a laser resonator provided with an intracavity wavefront correction device for correcting thermal distortion (aberration) in the lasing medium to obtain satisfactory beam quality.

To achieve the above-mentioned object, a laser resonator having an intracavity in which a lasing medium is positioned, according to the present invention comprises (a) retro-reflector means including optical means for expanding the wavefront leaving the lasing medium and concave mirror means for reflecting the expanded wavefront toward the lasing medium again while correcting wavefront aberrations induced when the laser beam passes through the lasing medium; and (b) output coupler means arranged facing said retro-reflector means with the lasing medium positioned within the intracavity formed between said output coupler means and said optical means, for providing feedback for regenerative action of the laser beam.

The optical means is a divergent lens or a convergent lens and a spatial filter in combination. The concave mirror means is an aspherical concave mirror for overcorrecting the expanded wavefront so that the overcorrected wavefront becomes a planar wavefront after having passed through the lasing medium. The geometry of the aspherical concave mirror is determined by optical interferometry technique, geometrical ray-tracing technique and computer-aided ray tracing technique.

BRIEF DESCRIPTION OF THE DRAWINGS

The features and advantages of the laser resonator according to the present invention will be more clearly appreciated from the following description taken in conjunction with the accompanying drawings in which:

FIG. 1 is a schematic illustration showing a prior-art stable telescopic laser resonator;

FIG. 2(A) is a schematic illustration showing a prior-art unstable positive branch laser resonator;

FIG. 2(B) is the similar illustration showing another prior-art unstable positive branch laser resonator;

DETAILED DESCRIPTION OF THE PREFERRED EMBODIMENTS

Figure 3A:
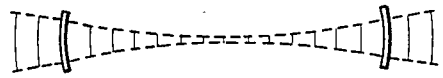
FIG. 3(A) is an illustration for assistance in explaining a stable resonator configuration.

To facilitate understanding of the present invention, a reference will be made to prior-art laser resonators, with reference to the attached drawings.

In FIG. 1, a prior-art stable telescopic laser resonator comprises a gain (lasing) medium 1, a telescope having a negative (divergent) lens 2 and a positive (convergent) lens 3, a partial reflective mirror (output coupler) 4, a 100% reflective mirror 5 and an aperture 6.

The telescope performs two separate functions. Firstly, it reduces the size of the laser beam to increase the diffraction per unit length. Since the diameter of the beam on the right side is always the same as that of a gain medium 1, the diffraction is constant and dependent only upon the telescope magnification M. An aperture diameter A is set to be D/M where D is a diameter of the laser rod (lasing medium). Secondly, the telescope is an element of variable focal length. The aperture 6 is introduced to increase the ratio of diffraction losses of the higher order modes to the lower order modes. The telescope can be adjusted to ensure that oscillation modes above a certain order do not reach threshold. Thus the mode selection process is controlled by two telescope parameters, the magnification M and the focal length f.

However, beam reduction in diameter on the left side of the resonator may cause damage to a mirror 4 when the power level is high.

In the above-description, the stable resonator implies that the mirror configuration corresponds to a stable periodic focusing system having a long slender Gaussian-profile lowest-order mode whose diameter is generally less than the diameter of the laser mirrors, as depicted in FIG. 3(A).

Figure 3B:
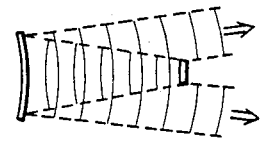
FIG. 3(B) is an illustration for assistance in explaining an unstable resonator configuration.

In contrast with this, an unstable resonator implies that the optical element configuration corresponds to a divergent periodic focusing system as depicted in FIG. 3(B), in which the lowest-order mode expands on repeated bounces to fill the entire cross section of at least one of the laser mirrors, however large it may be. The laser output is taken as a diffraction-coupled beam passing around rather than through a partially reflective output mirror.

Figure 4A:
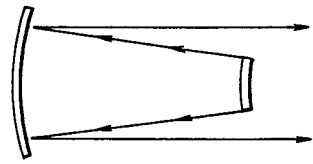
FIG. 4(A) is an illustration for assistance in explaining a positive branch confocal or telescopic unstable resonator configuration.
Figure 4B:
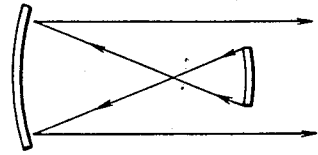
FIG. 4(B) is an illustration for assistance in explaining a negative branch confocal or telescopic unstable resonator configuration.

The most useful form of unstable resonator appears to be the confocal or "telescopic" unstable resonator. A primary advantage of this configuration is that it automatically produces a collimated output beam. Confocal configurations can be divided into positive and negative branches as shown in FIGS. 4(A) and 4(B), respectively.

FIGS. 2(A) and 2(B) show two unstable positive branch resonators using different output coupling methods. In the drawings, two opposing mirrors 11 and 12 constitute an unstable telescopic resonator with the gain medium 1 positioned within the cavity formed by the mirrors 11 and 12.

Output coupling from the unstable positive resonator can be achieved directly (in FIG. 2A) or indirectly (in FIG. 2B) with a diagonal coupling mirror 13 with a cut inner hole 13A. In both resonators shown in FIGS. 2(A) and 2(B), an annular near-field output beam is coupled to the outside of the resonator.

The negative branch confocal configuration has significant practical advantages in the form of more easily obtainable shorter-radius mirrors and considerably easier mirror alignment tolerances. However, the negative-branch resonator seems to be not universally employed in practice, because the internal focal point in the negative-branch case leads to unacceptable difficulties with optical breakdown.

The above-mentioned stable telescopic resonators are explained in further detail in P. H. Sarkies, Optics Communications Volume 31, Number 2, P 189, Nov. 1979. Further, the unstable optical resonators are disclosed in further detail in A. E. Siegman, Applied Optics Volume 13, No. 2, P 353, Feb. 1974, both being incorporated herein by reference.

In view of the above description, reference is now made to embodiments of the laser resonator according to the present invention. The feature of the present invention is to provide a new configuration of laser resonator of high output laser power, while significantly improving the laser beam quality by correcting the phase of intracavity regenerative wavefront thermally distorted through the laser medium in order to generate a planar wavefront.

Prior to the description of configuration of the laser resonator according to the present invention, optical distortions induced in a flashlamp-pumped laser rod (lasing medium) will be described.

In extracting more energy from a laser rod in large-volume near-Gaussian mode operation, the thermally induced lensing of the laser rod is greatly aberrated, that is, the resonator modes are thermooptically perturbed due to optical pumping. The pump-induced thermal lens in a laser rod is aberration-free only within the paraxial region (the space in the immediate neighborhood of the optical axis). However, in high power laser systems including a large cross-section rod, aberration will be produced by biaxial focusing due to stress-induced birefringence, non-spherical aberration resulting from non-uniform pumping, as well as astigmation caused by non-symmetrical excitation or grow-in rod imperfection.

When a solid-state laser rod is heated as a result of pump-light absorption, the temperature distribution is highly non-uniform. For cylindrical symmetry, the radial temperature distribution can be expressed as $$T(0) - T(r) = \frac{q_0 a^2}{4k} [\alpha(r/a)^2 + \beta(r/a)^4 + \sigma(r/a)^6 + \ldots] \quad (1)$$

where $T(r)$ is the temperature at the radial position r; $q_0$ is the thermal power density on axis; k is the coefficient of thermal conductivity; a is the radius of the laser rod; and $\alpha, \beta, \sigma \ldots$ are parameters dependent upon doping concentration, rod diameter, surface finishing condition, pumping arrangement characteristic, etc.

The associated spatial wavefront modulation resulting from a change in the index of refraction with the temperature is proportional to $[T(0)-T(r)]$. The first term in the bracket of equation (1) relates to the well-known spherical lens effect, and the following terms relate to the primary, secondary, and higher order spherical aberrations. The aspherical distortion in an optical resonator leads to an enhancement of the diffraction loss.

The change of the optical path lengths (OPL) through a laser rod can be measured by means of an interferometric technique. Although thermal lens aberration of the rod has significant effects upon the spacial mode profile of the resonator, there are still other factors such as gain saturation and birefringence, which may also influence the mode pattern of the laser.

In summary, a large wavefront aberration is present in a thermally distorted rod and causes significant perturbations of the optical resonator geometry. Severe distortion of resonator modes leads to a large radial variation in the intensity profile and substantial diffraction losses.

Figure 5:
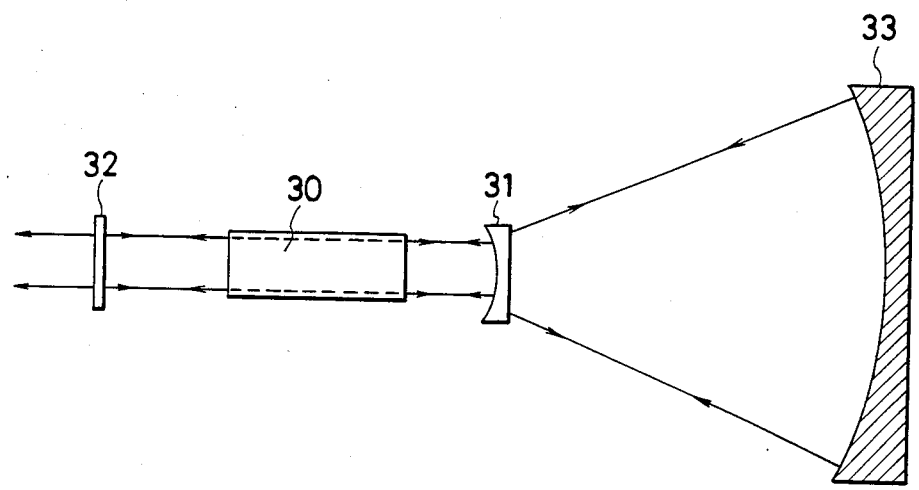
FIG. 5 is a schematic illustration showing a first embodiment of the laser resonator according to the present inventon.

FIG. 5 shows a first embodiment of the present invention. The stable optical laser resonator comprises a lasing gain rod (solid-state) medium 30, a negative (divergent) lens 31, a partially reflective output coupler 32, and a concave mirror 33.

The gain medium 30 provides regenerative action of the laser when pumped by two cylindrical flashlamps or a helical flashlamp (both not shown) which surrounds the rod medium 30. If two cylindrical flashlamps are used, the rod medium 30 is placed between them at the common focus of two ellipes whose other foci determine the placement of the flashlamps. The distance between foci, in each of the two ellipses sharing a common focus, is defined by the configuration of an elliptical reflector that surrounds the excitation sources and the laser rod. This arrangement provides an efficient coupling of excitation light into the laser medium.

Three major representatives of this type of solid-state laser are made of synthetic ruby, neodymium:glass (Nd:Glass), and neodymium:yttrium-aluminum-garnet (Nd:yAG). In each of these materials, the lasing ions exist as minority dopants in the host matrix.

The above two optical elements 31 and 33 constitute a retro-reflecting unit. The light wave builds up in the resonator when it makes several hundred round trips between the two opposing optical elements 32 and 31, 33.

On each round trip, a fraction of the radiant energy is transmitted through the partially transparent mirror 32 to form the laser's output beam, while the light amplified within the resonator cavity and partially reflected from the mirror 32 is fed back toward the lasing medium 30.

The concave mirror 33 is an aspherical mirror which can be easily produced by a diamond-machining process. The geometry (surface figure) of the retro-reflecting unit is important, especially the aspherical mirror 33, to the performance of the laser resonator. The geometry of the aspherical concave mirror 33 is so formed as to compensate for optical aberrations induced through the lasing medium 30 as already explained.

Figure 6:
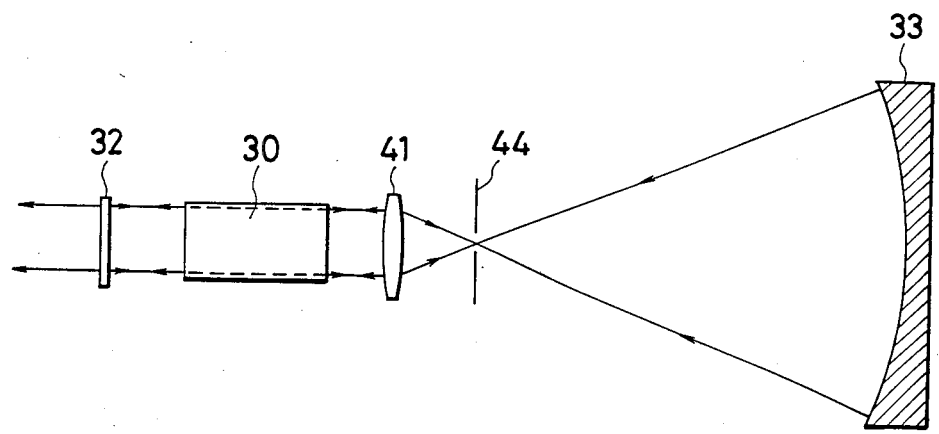
FIG. 6 is the similar illustration showing a second embodiment of the laser resonator according to the present invention.

FIG. 6 shows a second embodiment of the present invention. The divergent optical element 31 shown in FIG. 5 is replaced by a convergent optical element 41 and a spatial filtering aperture 44. The other elements are essentially the same as those shown in FIG. 5.

The spatial filter 44 is particularly effective to eliminate higher-order aberrations in the laser beam train, while the aspherical mirror 33 is properly formed so as to correct only lower-order aberrations. This embodiment is the most suitable for laser systems in which the gain medium 30 induces higher-order aberrations to the optical beam train.

In determination of the geometry of the aspherical concave mirror 33, wavefront distortion induced by the gain medium 30 is first measured by means of the technique of optical interferometry. This interferometry utilizes an instrument which can precisely determine wavelength, spectral fine structure, indices of refraction, and very small linear displacement through the separation of light, by means of an optical system including mirrors and glass plates, into two parts that travel unequal optical paths and consequently interfere with each other when reunited.

The output of the interferometric test is an interference fringe pattern which can be observed in real time and/or photographed to produce an interferogram (a record of optical interference phenomena as a pattern of interference fringes). The wavefront information can thus be inferred from this interferogram.

Figure 7:
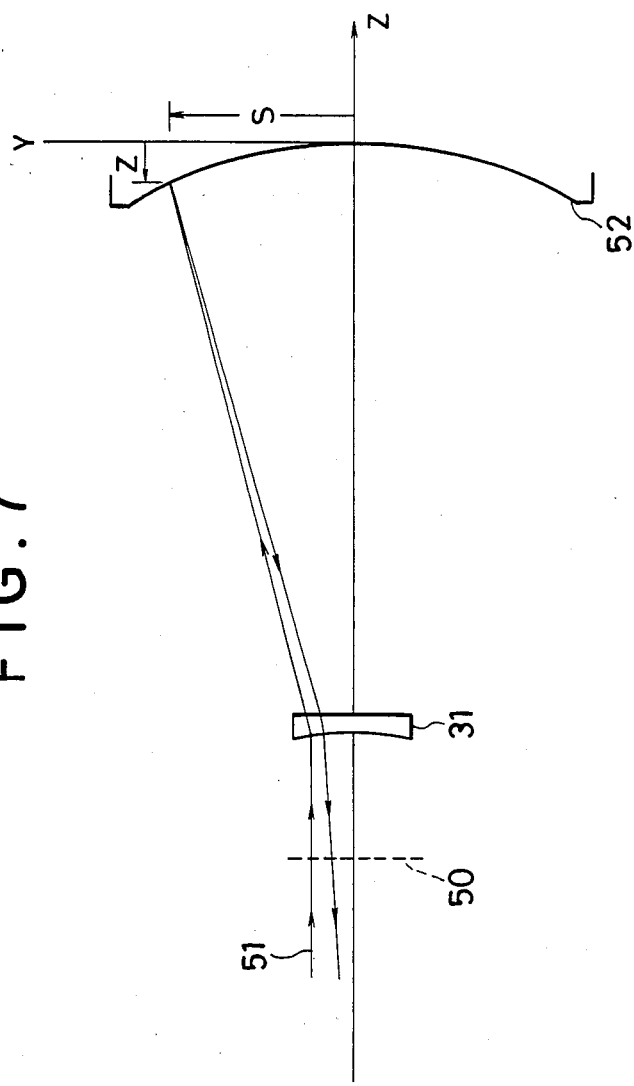
FIG. 7 is an illustration for assistance is explaining the basic idea in forming an intracavity wavefront correction device incorporated with the laser resonator according to the present invention.

Secondly, the measured interferometric data representing the distorted wavefront due to the gain medium is incorporated with the correction of the optical system, that is, with the retro-reflecting unit, as depicted in FIG. 7 in which the gain medium 30 is represented as a phase plate 50. Then, geometrical ray-tracing technique is employed to trace a bundle of rays 51 through the clear aperture of the gain medium to calculate the optical-pathlength-difference (OPD) versus aperture position that represents an OPD Map. The scenario of wavefront correction underlying the present invention is to minimize variation in the OPD Map by selecting proper surface parameters associated with the geometry of correcting mirror 52 via optical design procedure.

The geometry of the correcting mirror 52 can be defined by the following equation, taking the Z-axis as the axis of revolution:

$$Z = \frac{(CURV)S^2}{1 + [1 - (K + 1)(CURV)^2 S^2]^{\frac{1}{2}}} + \quad (2)$$

$$(A)S^4 + (B)S^6 + (C)S^8 + (D)S^{10}$$

where Z denotes the surface sag (a distance from the X-Y plane); S is the distance from the Z-axis on the x-y plane ($S^2 = X^2 + Y^2$); CURV denotes the curvature; A, B, C and D are the aspherical deformation constants; and K is the conic constant.

The variation of the OPD Map can be minimized by proper selection of the above surface constants, i.e. CURV, A, B, C, D and K. To find the optimal condition to minimize the variation of the OPD Map, computer-aided ray-tracing technique is employed.

A brief description of the relationship between the aspherical mirror surface sag as shown in Expression (2) and the diamond machining process is given in the following paragraphs.

The basic diamond machining process is that of single-point turning or milling of a surface in the fashion of ordinary machine shop fabrication but using a very precise machine and special diamond tools. The diamonds used are of gem quality and are mounted and polished to a supersharp, highly accurate, radiused cutting edge.

In the case of a metal workpiece, material is removed by the tool in machining by shearing a chip from the surface. The idealized surface profile in a diametric plane perpendicular to the turned work surface is expressed by its surface sag described by Expression (2). The fabrication data for an aspherical mirror in the diamond-machining process are tabulated as shown in Table I below by way of example, and used to control the movement of the diamond tool.

TABLE I

| ASPHERIC | CURV | K | A |
|---|---|---|---|
| A (1) | 10.00261423 | 0.0 | 10.100 E − 08 |

TABLE I-continued

| | B | C | D |
|---|---|---|---|
| | 0.00 E + 00 | 0.00 E + 00 | 0.00 E + 00 |

CURVATURE OF BEST SPHERE = −0.002615
RADIUS OF BEST SPHERE = −382.337

| S | ASPH SAG (Z) | SPHERE SAG | SAG DIFFERENCE |
|---|---|---|---|
| 0.000000 | 0.000000 | 0.000000 | 0.000000 |
| 0.100000 | −0.000013 | −0.000013 | 0.000000 |
| 0.200000 | −0.000052 | −0.000052 | 0.000000 |
| 0.300000 | −0.000118 | −0.000118 | 0.000000 |
| 0.400000 | −0.000209 | −0.000209 | 0.000000 |
| 0.500000 | −0.000327 | −0.000327 | 0.000000 |
| 0.600000 | −0.000471 | −0.000471 | 0.000000 |
| 0.700000 | −0.000641 | −0.000641 | 0.000000 |
| 0.800000 | −0.000837 | −0.000837 | 0.000000 |
| 0.900000 | −0.001059 | −0.001059 | −0.000001 |
| 1.000000 | −0.001307 | −0.001308 | −0.000001 |
| 1.100000 | −0.001582 | −0.001582 | −0.000001 |
| . | . | . | . |
| 24.900000 | −0.811668 | −0.811677 | −0.000009 |
| 25.000000 | −0.818211 | −0.818217 | −0.000006 |
| 25.100000 | −0.824780 | −0.824783 | −0.000003 |
| 25.200000 | −0.831375 | −0.831375 | −0.000000 |

Figure 8:
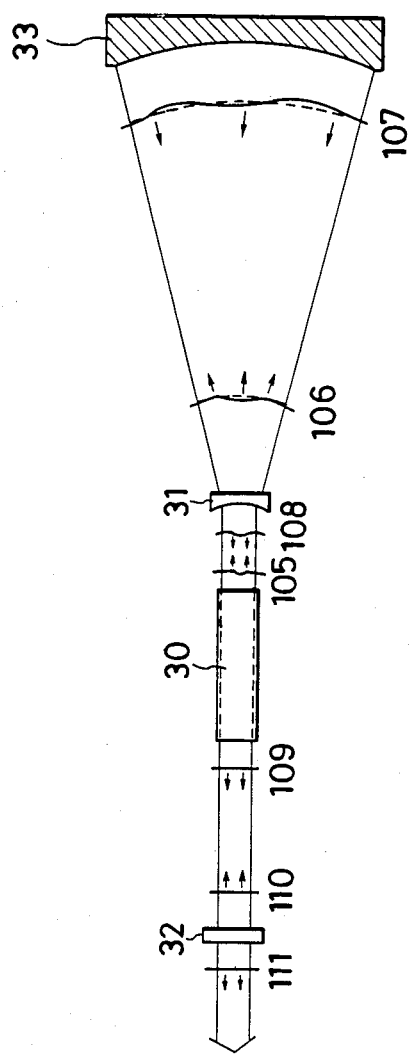
FIG. 8 is an illustration for assistance in explaining the wavefront variation in the laser beam train, which represents certain principles of the present invention.

In operation, as illustrated in FIG. 8. a distorted wavefront 105 leaving the laser gain medium 30 propagates toward the divergent optics (negative lens) 31, and the diverged and distorted wavefront 106 propagates further toward the correction optics (mirror) 33. Upon reflection from the aspherical correction mirror 33, the wavefront 106 is over-corrected as depicted by the wavefront 107. The over-corrected converged wavefront 108 leaving the divergent optics 31 will become a planar wavefront 109 after having passed through the gain medium 30 again. The output coupler (partially reflective mirror) 32 provides feedback for regenerative action of the optical beam, while wavefront 111 of the output is also nearly plane.

As described above, the laser resonator provided with the aspherical concave correction mirror can provide significantly higher beam quality in high output laser power.

What is claimed is:

1. A laser resonator having a cavity for the propagation of a laser beam having a wavefront in which a lasing medium is positioned, comprising:
   (a) a retro-reflector means including:
      (1) optical means disposed in said cavity for expanding the wavefront leaving the lasing medium; and
      (2) aspherical concave mirror means disposed in said cavity facing said optical means for reflecting the expanded wavefront toward the lasing medium again and correcting wavefront aberrations induced when the laser beam passes through the lasing medium; and
   (b) output coupler means arranged facing said retro-reflector means with the lasing medium positioned within an intracavity formed between said output coupler means and said optical means, for providing feedback for regenerative action of the laser beam.

2. The laser resonator as set forth in claim 1, wherein said optical means is a divergent lens.

3. The laser resonator as set forth in claim 1, wherein said optical means comprises a convergent lens and a spatial filter.

4. The laser resonator as set forth in claim 1, wherein said aspherical concave mirror means is an aspherical concave mirror.

5. The laser resonator as set forth in claim 4, wherein said aspherical concave mirror has an aspherical reflecting surface from which the expanded wavefront becomes a planar wavefront after having passed through the lasing medium again.

6. The laser resonator as set forth in claim 3, wherein said spatial filter eliminates higher-order aberrations in the laser beam, while said aspherical concave mirror means corrects lower-order aberrations.

7. The laser resonator as set forth in claim 4, wherein geometry of said aspherical concave mirror is defined by the following equation:

$$Z = \frac{(CURV)S^2}{1 + [1 - (K+1)(CURV)^2 S^2]^{\frac{1}{2}}} + (A)S^4 + (B)S^6 + (C)S^8 + (D)S^{10}$$

where Z=surface sag; S=radius; CURV=curvature; A, B, C, D=aspherical deformation constants; and K=the conic constant.

8. The laser resonator as set forth in claim 7, wherein optimal surface constants CURV, A, B, C, D, and K are determined in accordance with:
   (a) an interference fringe pattern observed by means of optical interferometry technique;
   (b) an optical-pathlength difference map representative of the relationship between the optical-pathlength difference and aperture position and calculated by means of geometrical ray-tracing technique; and
   (c) variation in the optical-pathlength difference map through selection of proper surface parameters minimized by means of a computer-aided ray tracing technique.

9. The laser resonator as set forth in claim 4, wherein said aspherical concave mirror includes a reflection surface formed by a diamondmachining apparatus.

* * * * *